(12) United States Patent
Song

(10) Patent No.: US 6,795,134 B2
(45) Date of Patent: Sep. 21, 2004

(54) LIQUID CRYSTAL DISPLAY DEVICE AND METHOD OF MANUFACTURING THE SAME

(75) Inventor: In-Duk Song, Kyoungsangbuk-do (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/377,733

(22) Filed: Mar. 4, 2003

(65) Prior Publication Data

US 2003/0137622 A1 Jul. 24, 2003

Related U.S. Application Data

(63) Continuation of application No. 09/661,291, filed on Sep. 13, 2000, now Pat. No. 6,567,151.

(30) Foreign Application Priority Data

Sep. 13, 1999 (KR) .......................................... 1999-38974

(51) Int. Cl.$^7$ .............................................. G02F 1/136
(52) U.S. Cl. ........................................................ 349/44
(58) Field of Search .................................. 349/44, 187

(56) References Cited

U.S. PATENT DOCUMENTS

| 5,414,547 | A | * | 5/1995 | Matsuo et al. | 349/44 |
| 5,946,060 | A | * | 8/1999 | Nishiki et al. | 349/48 |
| 6,356,319 | B1 | | 3/2002 | Park et al. | |
| 6,567,151 | B1 | * | 5/2003 | Song | 349/187 |

* cited by examiner

Primary Examiner—Robert H. Kim
Assistant Examiner—P. R. Akkapeddi
(74) Attorney, Agent, or Firm—Birch, Stewart, Kolasch & Birch, LLP

(57) ABSTRACT

An upper substrate of a liquid crystal display device includes a color filter and a black matrix. A lower substrate includes a gate insulating layer formed of the substrate, a data line formed on the gate insulating layer, a light shielding pattern formed on the gate insulating layer and spaced apart from the data line, a passivation film formed on the data line and the light shielding pattern, a pixel electrode formed on the passivation film and overlapping a portion of the light shielding pattern. The light shielding pattern includes two light shielding lines formed parallel to and on either side of the data line. Such an arrangement reduces a parasitic capacitance between the pixel electrode and the data line, while maintaining a high aperture ratio.

6 Claims, 4 Drawing Sheets

LIQUID CRYSTAL DISPLAY DEVICE AND METHOD OF MANUFACTURING THE SAME

CROSS REFERENCE

This application is a continuation of 09/661,291 dated Sep. 9, 2000 now, U.S. Pat. No. 2,567,151, which claims the benefit of Korean Patent Application No. 1999-38974, filed on Sep. 13, 1999, under 35 U.S.C. § 119, the entirety of which is hereby incorporated by reference.

BACKGROUND OF THE INVENTION

1. Field of the Invention

The present invention relates to a liquid crystal display (LCD) device and a method of manufacturing the same.

2. Description of Related Art

A typical LCD device includes lower and upper substrates with a liquid crystal layer interposed therebetween. The lower substrate has a thin film transistor (TFT) as a switching element and a pixel electrode, and the tipper substrate has a color filter and a common electrode. The pixel electrode serves to apply a voltage to the liquid crystal layer in conjunction with the common electrode, and the color filter serves to implement natural colors.

FIG. 1 is a plan view illustrating a lower array substrate of the conventional LCD device. As shown in FIG. 1, the lower array substrate includes gate lines 60 arranged in a transverse direction, data lines 70 arranged in a longitudinal direction, TFTs arranged near the cross point of the rate and data lines 60 and 70, and pixel electrodes 40 arranged on a region defined by the gate and data lines 60 and 70. Each of the TFTs includes a gate electrode 60a, a source electrode 70a, a drain electrode 70b, and a semiconductor layer 80. The gate electrode 60a extends from the gate line 60, and the source electrode 70a extends from the data line 70. The drain electrode 70b is laterally spaced from the source electrode 70a and is electrically connected with the pixel electrode 40 through a contact hole 90. A portion 35 of the pixel electrode 40 overlaps over the gate line 60, so that a storage capacitor is formed.

FIG. 2 is a cross sectional view taken along line II—II of FIG. 1. As shown in FIG. 2, the gate electrode 60a is formed on the substrate 100. The gate electrode 60a is made of a metal such as Al, Mo and Cr. A gate insulating layer 30 is formed on the exposed surface of the substrate 100 while covering the gate electrode 60a. The semiconductor layer 80 is formed over the gate electrode 60a. The semiconductor layer 80 is made of an amorphous silicon. An ohmic contact layer 81 which is ion-doped by impurities is formed on the semiconductor layer, and a portion of the ohmic contact layer 81 over the gate electrode 60a is removed. The source and drain electrodes 70a and 70b overlay the ohmic contact layer 81 at both end portions of the semiconductor layer 80. A passivation film 50 is formed over the whole surface of the substrate while covering the source and drain electrodes 70a and 70b. The passivation film 50 has the contact hole 90 therein to expose a predetermined portion of the drain electrode 70b. The pixel electrode 40 is formed on the passivation film 50 and is electrically connected with the drain electrode 70b through the contact hole 90.

FIG. 3 is a cross sectional view taken along line III—III of FIG. 1. As shown in FIG. 3, the two adjacent pixel electrodes 40 are spaced apart from each other, and the passivation film 50 is interposed between the data line 70 and the pixel electrodes 40. Also, the pixel electrodes 40 are horizontally spaced apart from the data line 70. A black matrix (not shown) is arranged on the upper substrate to cover a space between the data line 70 and the pixel electrode 40, so that light leakage is prevented. Parasitic capacitors $cd_1$ and $cd_2$ are formed between the data line 70 and the two adjacent pixel electrodes 40. The capacitance of the parasitic capacitors $cd_1$ and $cd_2$ increases as a distance between the data line 70 and the pixel electrode 40 becomes smaller. Due to the parasitic capacitors, voltages applied to the data line 70 are distorted and cross talk occurs, leading to poor display quality. Decreasing the parasitic capacitance by lengthening the distance between the data line and the pixel electrode results in a lower aperture ratio.

For the foregoing reasons, there is a need for a liquid crystal display device that can decrease the effects of a parasitic capacitance formed between a data line and a pixel electrode and thereby improve an aperture ratio and a display quality.

SUMMARY OF THE INVENTION

To overcome the problems described above, preferred embodiments of the present invention provide a liquid crystal display device having a high aperture ratio and a high display quality.

For example, a preferred embodiment of the present invention provides a liquid crystal display device, including an upper substrate having a color filter and a black matrix; a lower substrate having: a gate insulating layer formed thereon, a data line formed on the gate insulating layer, a light shielding pattern formed on the gate insulating layer and spaced apart from the data line, a passivation film formed over the gate insulating layer, the data line, and the light shielding pattern, and a pixel electrode formed on the passivation film and overlapping a portion of the light shielding pattern; and a liquid crystal layer interposed between the upper and lower substrates.

As a further example, another embodiment of the present invention provides a method of manufacturing a liquid crystal display device, including forming a gate insulating layer on a substrate; depositing a metal layer on the gate insulating layer; patterning the metal layer to form a data line and a light shielding pattern spaced apart from the data line; forming a passivation film over the gate insulating layer, the data line, and the light shielding pattern; and forming a pixel electrode on the passivation film, the pixel electrode overlapping a portion of the light shielding pattern.

The present invention, among other things, advantageously lowers the parasitic capacitance between the data line and the pixel electrode, thereby bringing about a high display quality and a high aperture ratio.

BRIEF DESCRIPTION OF THE DRAWINGS

For a more complete understanding of the present invention and the advantages thereof, reference is now made to the following descriptions taken in conjunction with the accompanying drawings, in which like reference numerals denote like parts, and in which.

DETAILED DESCRIPTION OF PROFFERED EMBODIMENTS

Reference will now be made in detail to a preferred embodiment of the present invention, example of which is illustrated in the accompanying drawings.

Figure 4:
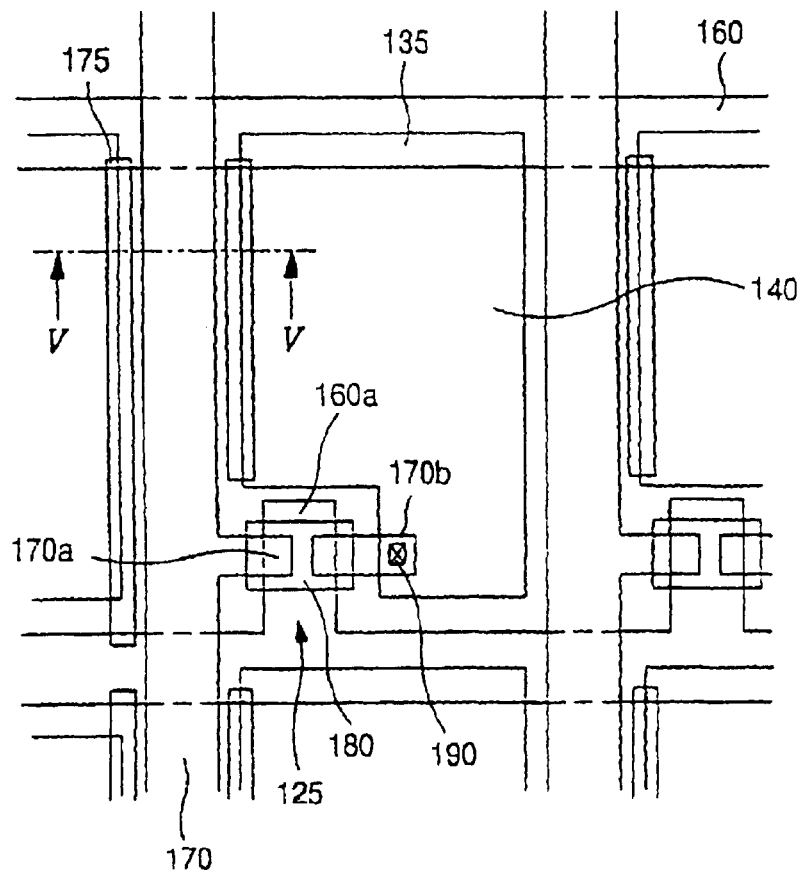
FIG. 4 is a plan view illustrating a lower array substrate of a liquid crystal display device according to a preferred embodiment of the present invention.

FIG. 4 is a plan view illustrating a lower array substrate of a liquid crystal display device according to a preferred embodiment of the present invention. As shown in FIG. 4, the lower array substrate includes gate lines 160 arranged in a transverse direction and data lines 170 arranged in a longitudinal direction. TFTs 125 are arranged near a crossing point of the gate and data lines 160 and 170. Pixel electrodes 140 are arranged on a region defined by the gate and data lines 160 and 170, and light shielding patterns 175 are arranged in the same direction as the data lines 170. Each of the TFTs 125 includes a gate electrode 160a, a source electrode 170a, a drain electrode 170b, and a semiconductor layer 130. The gate electrode 160a extends from the gate line 160, and the source electrode 170a extends from the data line 170. The drain electrode 170b is spaced from the source electrode 170a and is electrically connected to the pixel electrode 140 through a contact hole 190. A portion 135 of the pixel electrode 140 overlaps over the gate line 160, so that a storage capacitor is formed. The light shielding pattern 175 serves to lower the effects of the parasitic capacitor formed between the data line 170 and the pixel electrode 140.

Figure 5:
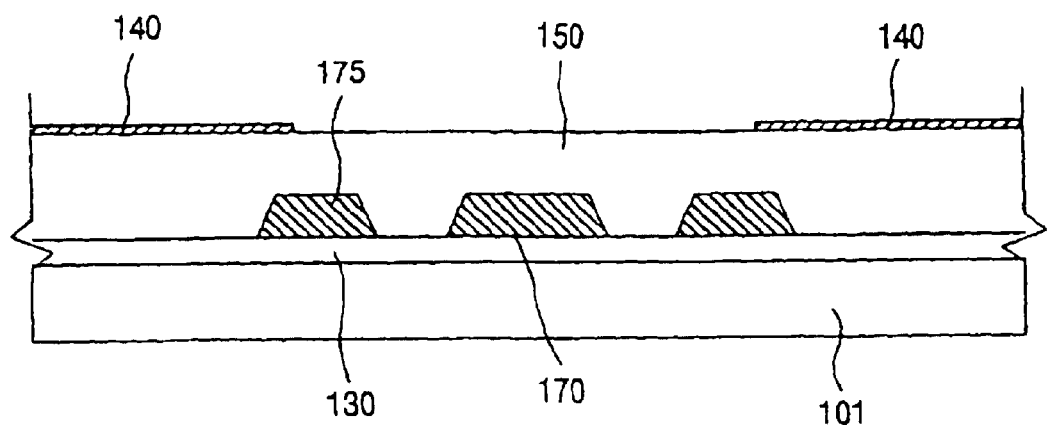
FIG. 5 is a cross sectional view taken along line V—V of FIG. 4.

FIG. 5 is a cross sectional view taken along, line V—V of FIG. 4. As shown in FIG. 4, the light shielding pattern 175 is formed on a gate insulating layer 130 along with the data line 170. It is preferable that the light shielding pattern 175 be made of the same material as that of the data line 170. In other words, a metal layer is deposited on the gate insulating layer 130 and is patterned to form both the light shielding layer 175 and the data line 170. The light shielding pattern 175 is spaced apart from and electrically separated from the data line 170. A passivation layer 150 is formed on the exposed surface of the gate insulating layer 130, the data line 170 and the light shielding pattern 175. The pixel electrode 140 is formed on the passivation layer 150 and overlaps an outer end portion of the light shielding pattern 175.

Figure 1:
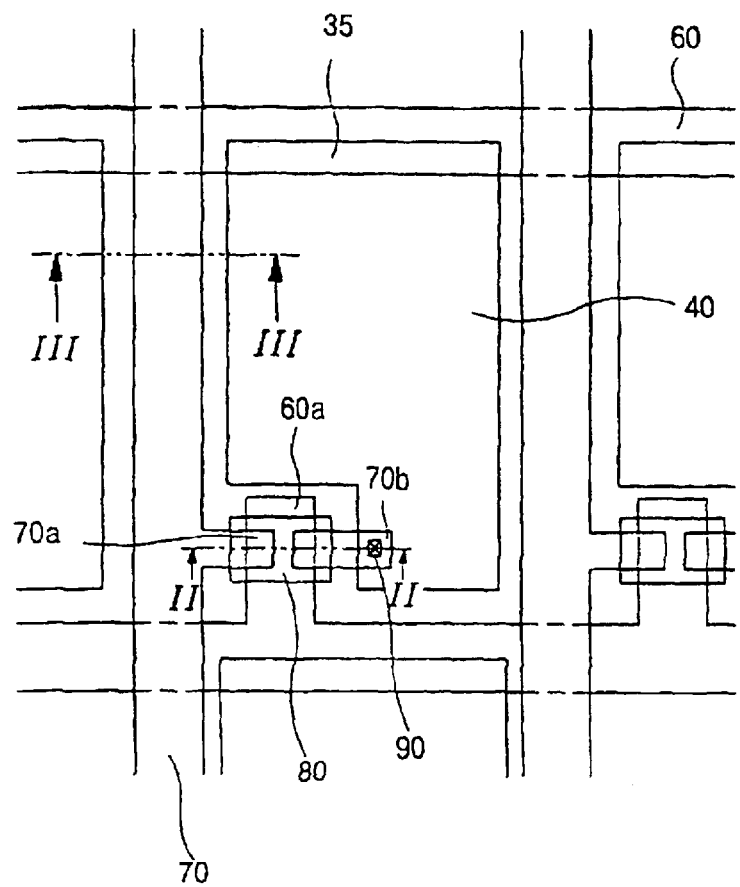
FIG. 1 is a plan view illustrating a lower array substrate of a conventional liquid crystal display device.
Figure 2:
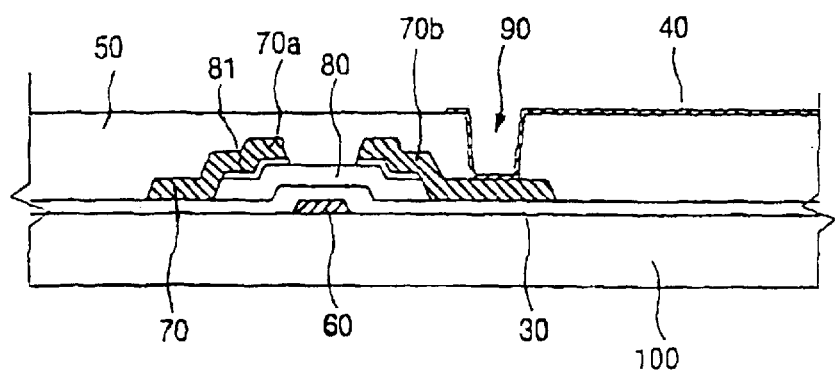
FIG. 2 is a cross sectional view taken along line II—II of FIG. 1.
Figure 3:
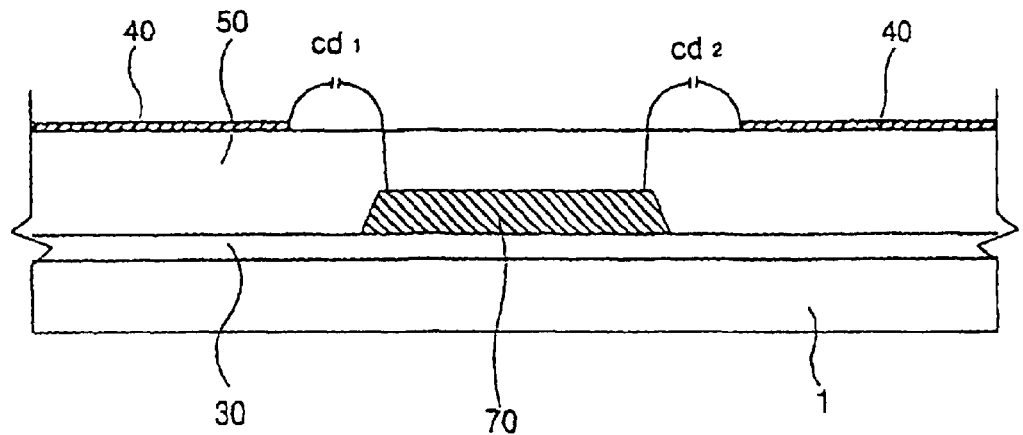
FIG. 3 is a cross sectional view taken along line III—III of FIG. 1.
Figure 8:
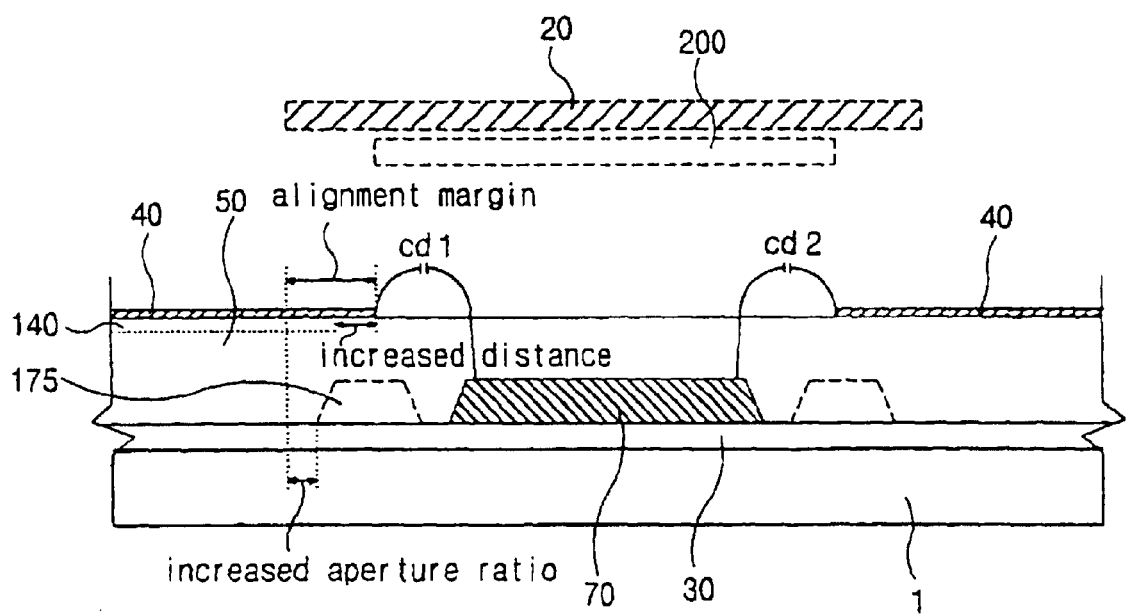
FIG. 8 is a cross sectional view comparing and contrasting the related art device of FIG. 3 with the device of FIG. 5.

FIG. 8 is a cross sectional view comparing and contrasting the related art device of FIG. 3 with the device of FIG. 5. A related art black matrix 20 arranged on the upper substrate (not shown) is aligned to cover a space between the data line and the related art pixel electrode 40, thereby preventing light leakage. The overlap between the related art black matrix 20 and the pixel electrode 40 defines an "alignment margin," which is a design margin necessary to avoid light leakage due to an alignment error between the upper and lower substrates. This alignment error is typically ±5 μm. As noted in the description of FIG. 3, if the related art pixel electrode 40 were shortened to reduce parasitic capacitance, the black matrix 20 must be extended (thereby lowering the aperture ratio) in order to maintain the alignment margin.

By contrast, FIG. 8 also shows that the light shielding pattern 175 according to the present invention prevents light leakage, resulting advantageously in a smaller black matrix 200 being sufficient to cover a space between the data line 170 and the light shielding, pattern 175. That is, the black matrix 200 need only extend past the inner side of the tight shielding pattern 175 by the alignment margin. With this arrangement, the pixel electrode 140 may be moved an "increased distance," as shown in FIG. 8, from the data line 170, thereby decreasing the parasitic capacitances $cd_1$ and $cd_2$. However, because the alignment margin is now measured from the inner side of the light shielding pattern 175, moving the electrode 140 does not require extending the black matrix 200 (and hence decreasing aperture ratio) to maintain the alignment margin, as in the related art. Rather, the light shielding pattern 175 may be designed to overlap the pixel electrode 140 less than the related art black matrix 20 did, due to the fact that the light shielding pattern 175 and the pixel electrode 140 are on the same substrate (and thus need significantly less of an alignment margin). Due to this smaller overlap by the light shielding pattern 175, an increased aperture ratio results, as shown in FIG. 8. Hence, the light shielding pattern 175 according to the present invention allows the distance between the pixel electrode 140 and the data line 170 to be increased, and the parasitic capacitance to be lowered, while increasing the aperture ratio.

Figure 6:
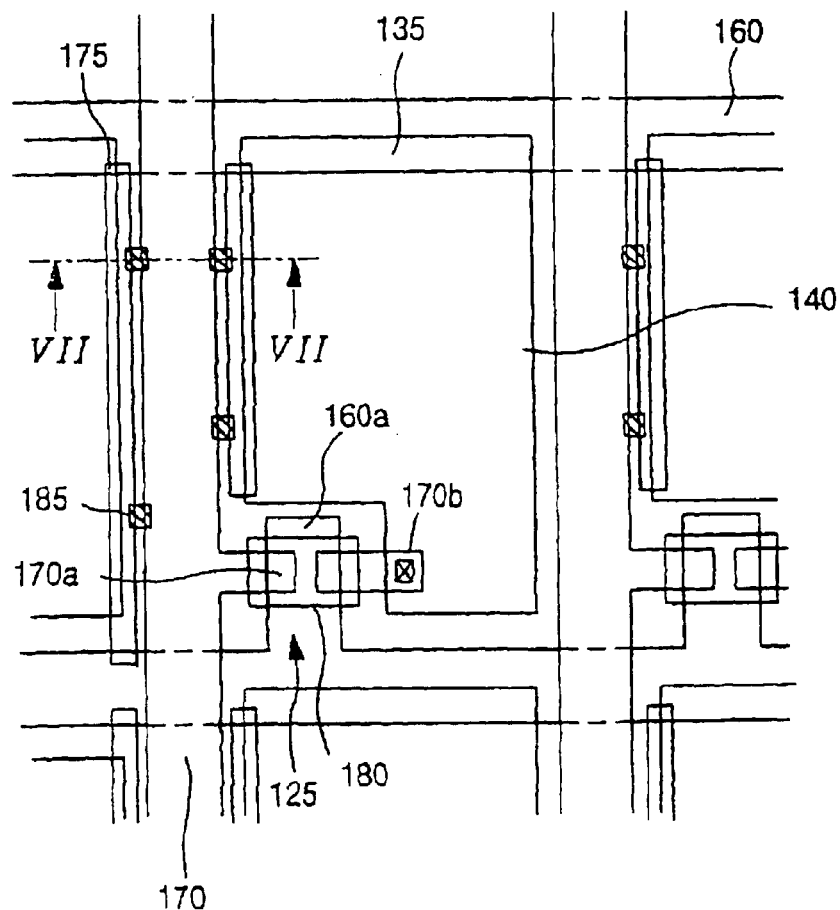
FIG. 6 is a plan view illustrating a modification of the lower array substrate of the liquid crystal display device according, to a preferred embodiment of the present invention.
Figure 7:
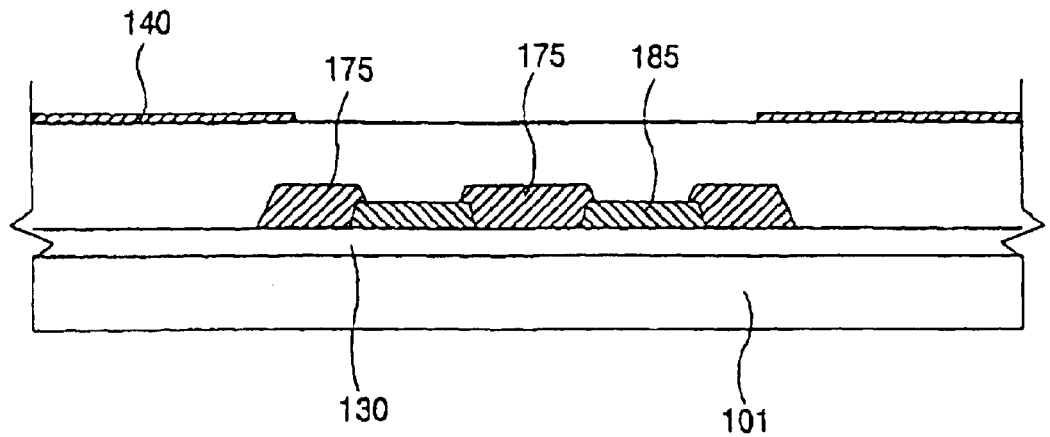
FIG. 7 is a cross sectional view taken along line VII—VII of FIG. 6.

FIG. 6 is a plan view illustrating a modification of the lower array substrate of the liquid crystal display device according to a preferred embodiment of the present invention, and FIG. 7 is a cross sectional view taken along line VII—VII of FIG. 6. As shown in FIGS. 6 and 7, a resistive patterns 185 are further formed in a space between the data line 170 and the light shielding pattern 175. The resistive pattern 185 serves to discharge the light shielding pattern 175 charged during the manufacturing process and thus is connected with the data line 170 and the light shielding pattern 175. The resistive pattern 185 is made of a high resistive material and preferably amorphous silicon. The resistive pattern 185 may be formed before or after formation of the data line 170 and the light shielding pattern 175.

As described above, due to the light shielding pattern that is formed on the same plane as the data line and is spaced apart from the data line and whose outer end portion overlaps the pixel electrode, the parasitic capacitance between the data line and the light shielding pattern becomes lowered, thereby bring about a high display quality and a high aperture ratio.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A liquid crystal display device, comprising:

an upper substrate having a color filter and a black matrix;

a lower substrate having:
  a gate insulating layer formed thereon,
  a data line formed on the gate insulating layer,
  a plurality of light shielding patterns formed on the gate insulating layer and spaced apart from the data line,
  a passivation film formed over the gate insulating layer, the data line, and the light shielding pattern, and
  a plurality of pixel electrodes formed on the passivation film and overlapping a portion of each of the plurality of light shielding patterns so that a gap is formed between the pixel electrode and the data line on the portion of the passivation film over the data line;

a liquid crystal layer interposed between the upper and lower substrates;

and resistive pattern formed in contact with the dat line and the plurality of light shielding patterns.

2. The liquid crystal display device of claim 1, wherein the plurality of light shielding patterns are made of the same material as the data line.

3. The liquid crystal display device of claim 1, wherein the resistive pattern is made of a material having a high resistivity.

4. The liquid crystal display device of claim 3, wherein the resistive pattern is made of amorphous silicon.

5. The liquid crystal display device of claim 1, wherein the plurality of light shielding pattern includes two shielding lines formed parallel to and on both sides of the data line.

6. The liquid crystal display device of claim 5, wherein the portion of each of the plurality of light shielding pattern overlapped by the pixel electrode includes an end of a shielding line.

* * * * *